United States Patent [19]

Shinbori et al.

[11] Patent Number: 5,120,907
[45] Date of Patent: Jun. 9, 1992

[54] DEVICE FOR DETERMINING POSITION COORDINATES OF POINTS ON A SURFACE

[75] Inventors: Hiroichi Shinbori; Toshihito Marui; Daizou Yamazaki, all of Tokyo, Japan

[73] Assignee: Graphtec Kabushiki Kaisha, Tokyo, Japan

[21] Appl. No.: 496,791

[22] Filed: Mar. 21, 1990

[30] Foreign Application Priority Data

Mar. 28, 1989 [JP] Japan .................................. 1-75672
Mar. 31, 1989 [JP] Japan .................................. 1-38858

[51] Int. Cl.$^5$ ............................................. G08C 21/00
[52] U.S. Cl. ........................................... 478/18; 178/19
[58] Field of Search .................................. 178/18, 19

[56] References Cited

U.S. PATENT DOCUMENTS

| | | | |
|---|---|---|---|
| 3,801,733 | 4/1974 | Bailey | 178/19 |
| 4,704,501 | 11/1987 | Taguchi | 178/19 |
| 4,786,765 | 11/1988 | Yamanami et al. | 178/19 |
| 4,795,858 | 1/1989 | Yamazaki | 178/19 |
| 4,848,496 | 7/1989 | Murakami et al. | 178/19 |

FOREIGN PATENT DOCUMENTS 59-3537 1/1984 Japan .

*Primary Examiner*—Alvin E. Oberley
*Assistant Examiner*—Matthew Luu
*Attorney, Agent, or Firm*—Graham & James

[57] ABSTRACT

A device for determining position coordinates of points on a surface, has a tablet containing plural number of equally spaced driver windings and plural number of equally spaced sense windings. Each driver winding has a pair of parallel conductors laid in X-direction, and each sense winding has a pair of parallel conductors laid in Y-direction. A current is generated in a cursor coil by the voltage induced from the current in a nearby situated driver winding. This current in the cursor coil induces a voltage in a nearby situated sense winding. The X-position of a sense winding in which a maximum voltage is induced, and the Y-position of a driver winding which induces a maximum voltage in the cursor coil, determine the position coordinates of the cursor on the tablet. Auxiliary sense windings are supplemented to the tablet. Induced voltages on these auxiliary sense windings determine the Y-position of the cursor regardless of its X-position, and reduce the overall time required for position determination.

2 Claims, 7 Drawing Sheets

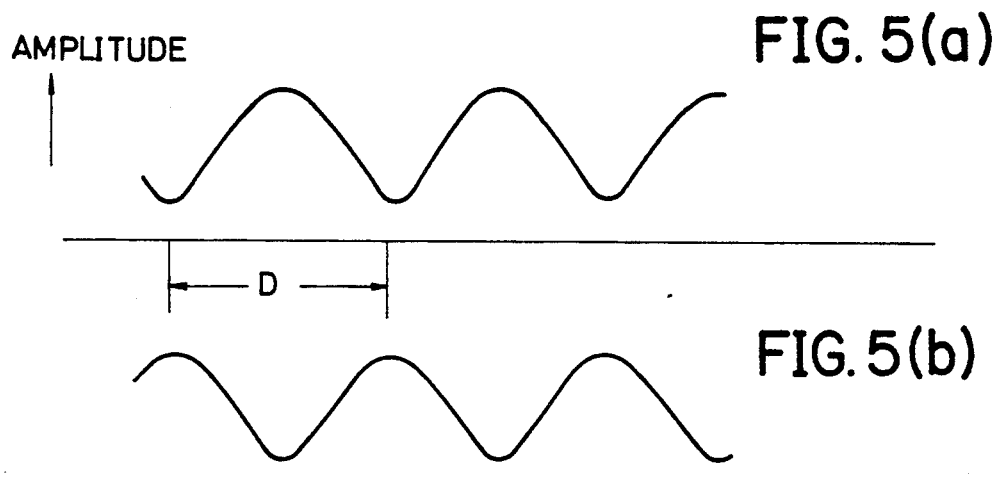
FIG. 5(a)
FIG. 5(b)
FIG. 5(c)

DEVICE FOR DETERMINING POSITION COORDINATES OF POINTS ON A SURFACE

BACKGROUND OF THE INVENTION

This invention relates to a device for determining position coordinates of points on a surface, and more particularly to such a device commonly called a cordless digitizer, which has a cursor (or cursors) not connected to a processor by an electric cable.

The prior arts of this invention are disclosed in U.S. Pat. Nos. 4,848,496, "COORDINATES INPUT APPARATUS" and No. 4,786,765 "COORDINATES INPUT SYSTEM". In these prior arts, a same grid winding in a tablet is used as a driver winding and a sense winding by time division system. A cursor has a tuning circuit which is tuned to the frequency of the current in the grid winding and maintains the current in the tuning circuit during the time when the driving current in the grid winding is suspended. This current in the tuning circuit induces a voltage in the grid winding. This voltage in the grid winding during the quiescent state is detected to determine the position of the cursor relative to the grid winding.

The grid windings are constituted of a plural number of equally spaced X-windings and a plural number of equally spaced Y-windings. Each X-winding is a one turn coil comprising a pair of parallel conductors laid in X-direction, and each Y-winding is a one turn coil comprising a pair of parallel conductors laid in Y-direction, Y-direction being perpendicular to X-direction.

The X-position of the cursor can be determined by the amplitude variation of the detected voltages in successive Y-windings, and the Y-position of the cursor can be determined by the amplitude variation of the detected voltages in successive X-windings.

Since the current in the tuning circuit of the cursor must be maintained during the period when there is no external excitation, the Q of the tuning circuit must be high (in other words, the damping must be low) and the amplitude detection must be completed in a short time. These special requirements in these prior arts come from the drive-sense-duplexing in which a same grid winding is used for a driver winding and a sense winding.

BRIEF DESCRIPTION OF THE INVENTION

Therefore, an object of the present invention is to provide a device in which the drive-sense-duplexing is eliminated. For this object, in the present invention, a group of X-windings are used as driver windings, and a group of Y-windings are used as sense windings. Since an X-winding is perpendicular to a Y-winding, an alternating current in any X-winding does not induce any voltage in any Y-winding. Only when the cursor is placed on the tablet, a driver winding which is near to the cursor induces an appreciable voltage in the cursor. The voltage induced in the cursor generates a current in the cursor coil, and this current in the cursor coil induces a voltage in a nearby sense winding. When all the combination of all the driver windings and sense windings are scanned to detect the voltages in the sense windings for all the combination, the position coordinates of the cursor can be determined.

Another object of this invention is to reduce the overall time required for the position determination. For this object, auxiliary sense windings are supplemented to the same tablet where the driver windings and the sense windings are provided. The induced voltages in the auxiliary sense windings determine the Y-position of the cursor regardless of its X-position, and thus reduces an overall time required for the position determination.

Still another object of this invention is to specify the attribute of the position input. The word attribute means, for example, a specified input timing for the determined position or a specified colour on a colour display of the determined position. For this purpose, different frequencies are employed in the alternating current in the driver windings. For the different frequencies in the driver windings, the tuning frequency of the tuning circuit of the cursor must be variable. Still another object of this invention is to provide a cursor configuration adapted for a variable tuning.

BRIEF DESCRIPTION OF THE DRAWINGS

Further objects, features, and advantages of this invention will become apparent from a consideration of the following description, the appended claims, and the accompanying drawings.

FIGS. 5a,b,c is a diagram illustrating amplitudes of voltages induced in the auxiliary sense windings.

DETAILED DESCRIPTION OF THE PREFERRED EMBODIMENT

Figure 1:
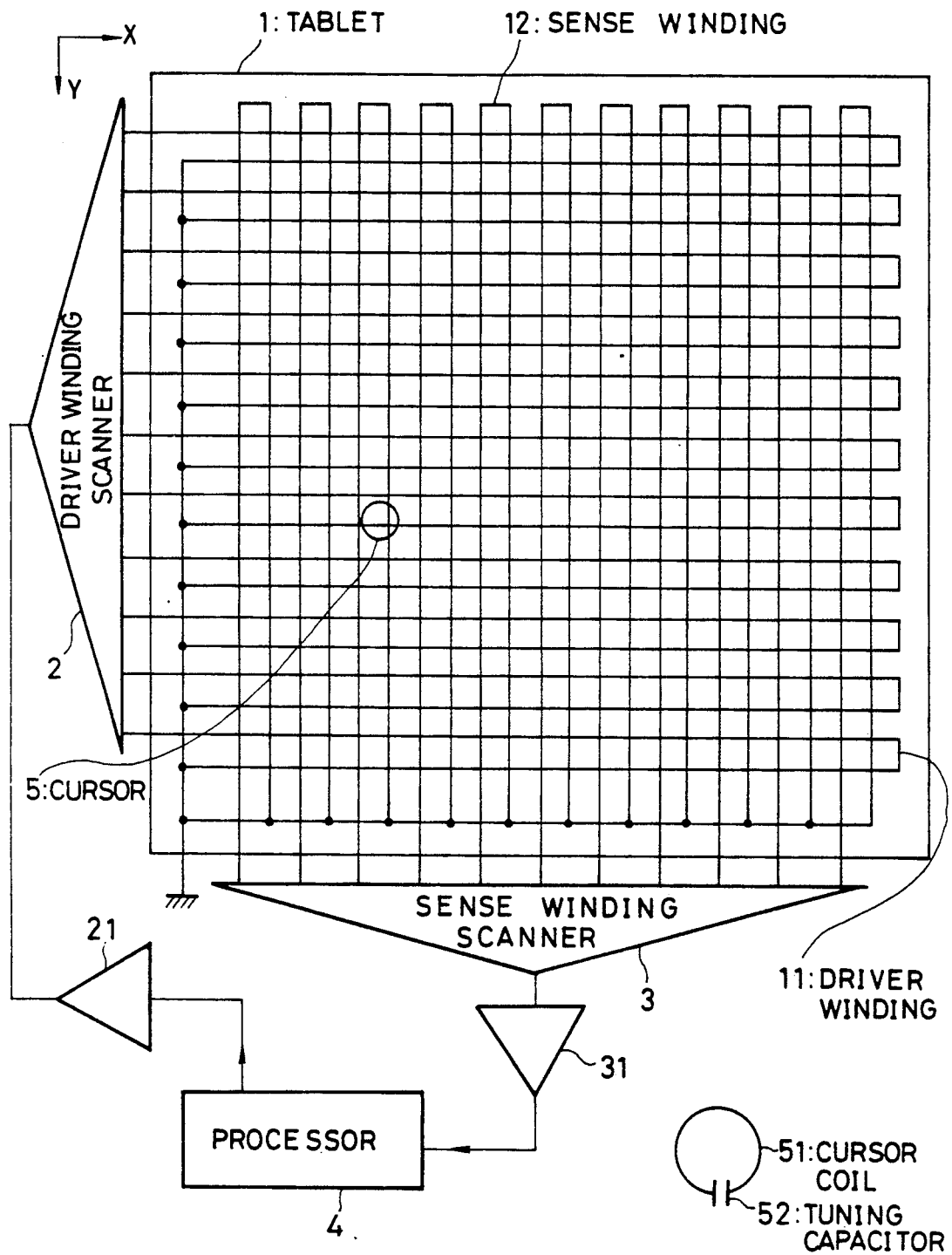
FIG. 1 is a schematic diagram of an embodiment of this invention.

The schematic diagram of FIG. 1 shows a tablet 1 containing plural number of equally spaced driver windings and plural number of equally spaced sense windings. Each driver winding 11 has a pair of parallel conductors laid in X-direction, and each sense winding 12 has a pair of parallel conductors laid in Y-direction. The driver windings and the sense windings are mutually insulated in the tablet 1 by an insulating layer.

One terminal of each driver winding 11 is grounded, and the other terminal is connected to a driver winding scanner 2, which connects each driver winding successively to the output of an amplifier 21.

One terminal of each sense winding 12 is grounded, and the other terminal is connected to a sense winding scanner 3, which connects each sense winding successively to the input of an amplifier 31.

A processor 4 supplies an alternating current to the amplifier 21, controls the driver winding scanner 2 and the sense winding scanner 3 for receiving the output of the amplifier 31 to determine the position coordinates of the cursor 5 on the tablet 1. The cursor 5 comprises a cursor coil 51 and a tuning capacitor 52. This coil 51 and the capacitor 52 tunes to the frequency of the driver winding current.

Figure 2:
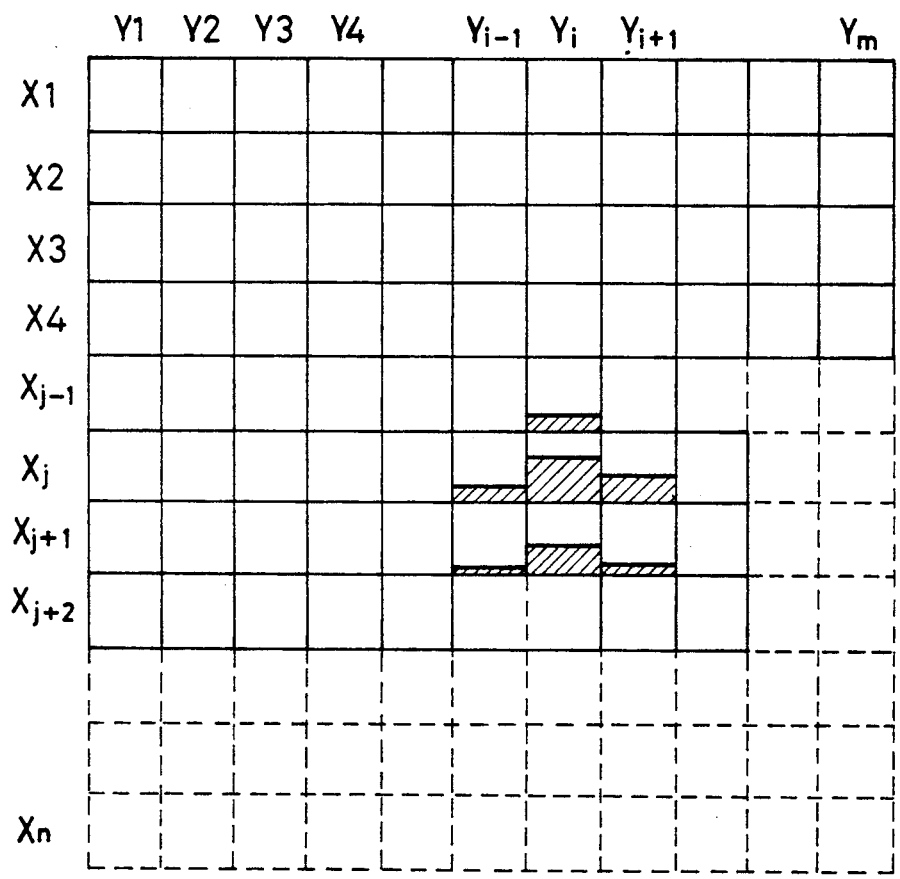
FIG. 2 is a diagram illustrating a time sequence of a position determination by the device shown in FIG. 1.

FIG. 2 illustrates a sequence of scanning, in which driver windings are designated by X1, X2, ... Xn according to the Y-position of each winding, and sense windings are designated by Y1, Y2, ... Ym according to the X-position of each sense winding.

In one embodiment of scanning, in which the primary scanning is in the X-direction of FIG. 2, an alternating current is supplied to the driver coil X1 and the sense winding scanner 3 connects Y1, Y2, ... Ym successively to the amplifier 31. Since the cursor 5 is not near to the driver winding X1, no appreciable voltage is induced in the cursor coil 51, and the input to the amplifier 31 are practically zero for all the Y1, Y2, ... Ym windings.

Then, the driver winding scanner 2 connects X2 to the amplifier 21 and the sense windings Y1, Y2, ... Ym are scanned. The driver winding X2 is not yet near enough to the cursor 5, and does not induce an appreciable voltage in the coil 51.

When the driver winding $Xj-1$ which is sufficiently near to the cursor 5 is connected to the amplifier 21, an appreciable voltage is induced in the coil 51 and generates a current in the tuning circuit of the coil 51 and the capacitor 52. But, since sense windings Y1, Y2, ... are not near to the cursor 5, no appreciable voltage is induced in these windings. When the sense winding Yi, which is the nearest sense winding to the cursor 5, is connected to the amplifier 31, a voltage is detected by the processor 4. This detected voltage is illustrated by a hatched rectangle in the Yi−1-Yi section in FIG. 2, the height of the hatched rectangle representing the amplitude of the voltage on the sense winding.

Similarly, for the driver windings, Xj, Xj+1, voltages as illustrated by hatched rectangles in FIG. 2 are obtained. In FIG. 2, those blocks having a dotted line on any side of the block, are anticipated from the preceding scannings to give a zero amplitude, and may be eliminated from the succeeding scanning procedure.

Estimating from the amplitude variation as shown in FIG. 2, the rough position of the cursor 5 is determined to be (Xj), (Yi) where (Xj) is the Y-position of the driver winding Xj, and (Yi) is the X-position of the sense winding Yi.

The mutual inductance Mdc between a driver winding 11 and the cursor coil 51 is a function of the distance between the coil 51 and the winding in Y-direction, and the mutual inductance Mcs between the cursor coil 51 and a sense winding 12 is a function of the distance between the coil 51 and the winding in X-direction. Since the amplitude of the current in the cursor coil 51 is proportional to Mdc, and the amplitude of the induced voltage in a sense winding is proportional to Mcs, the processor 4 can determine an exact position coordinates of the cursor 5 from an amplitude variation as illustrated by FIG. 2.

Figure 3:
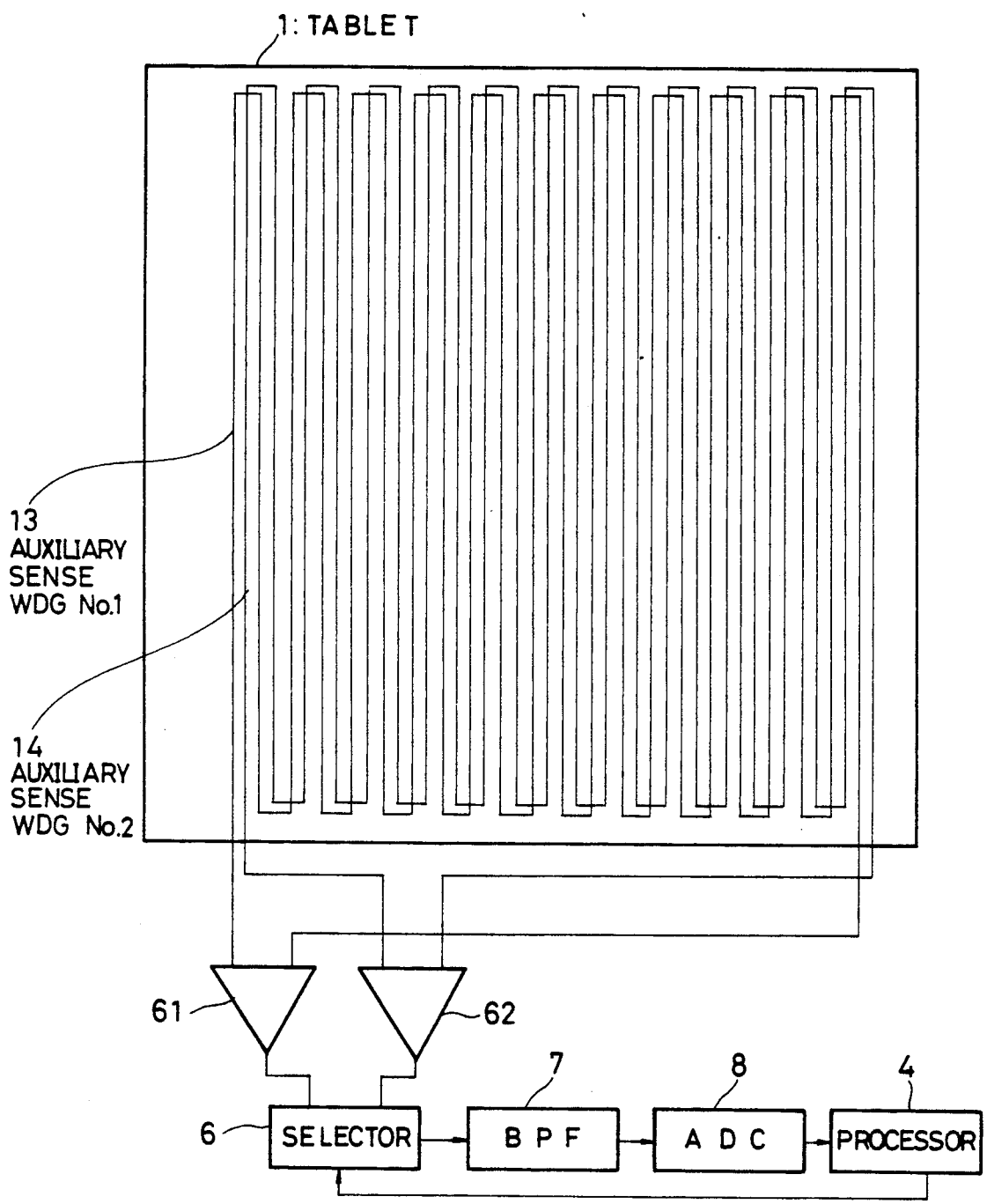
FIG. 3 is a schematic diagram of an embodiment of auxiliary sense windings and the associated circuits in this invention.

FIG. 3 shows an embodiment of auxiliary sense windings and their associated circuits of this invention. Auxiliary sense windings are Y-windings and, in this embodiment, there are two windings, No. 1 winding 13 and No. 2 winding 14. The tablet 1 may be a same tablet with the tablet 1 in FIG. 1. In case when a same tablet is used, the windings 11, 12, 13, 14 are mutually insulated by insulating layers respectively.

Both of these two windings 13, 14 have equally spaced conductors (the spacing being indicated by D in FIG. 4), conductors being end-connected in such a way that currents in all adjacent conductors flow in opposite directions. The spacing between the two windings is preferably D/2.

Figure 4:
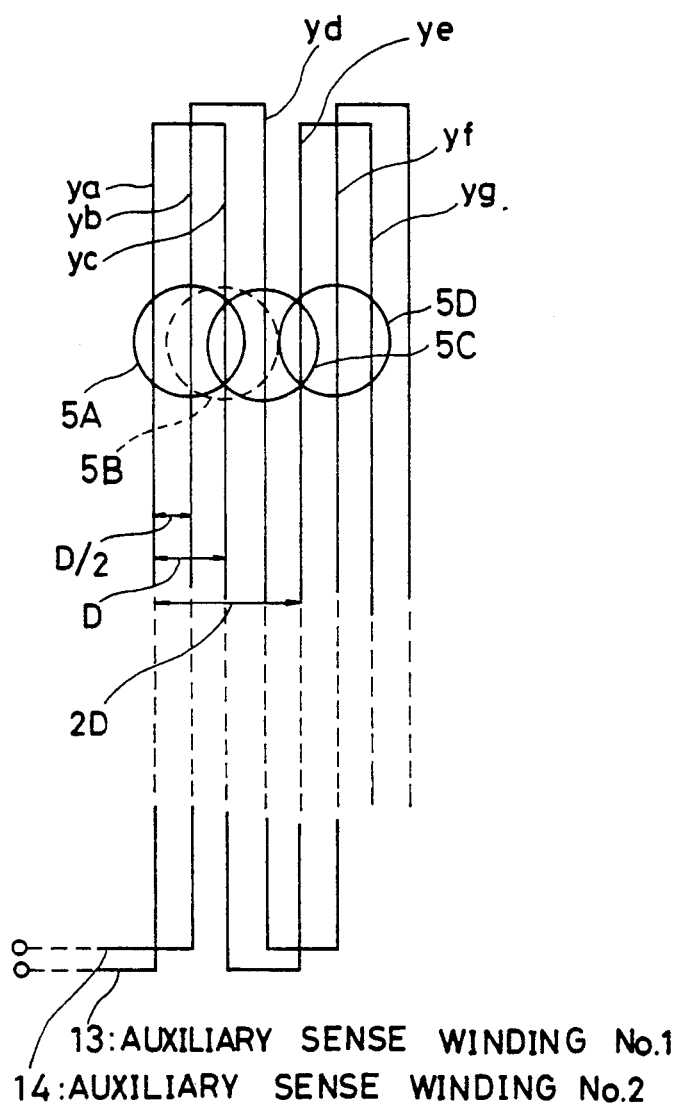
FIG. 4 is a schematic diagram illustrating a relative position between a cursor and the auxiliary sense windings.

FIG. 4 shows a relative position between a cursor coil 51 and the auxiliary sense windings. The conductors in the two windings are designated by ya, yb, yc, yd, ye, yf, yg, and the position of the cursor coil 51 by 5A, 5B, 5C, 5D.

In a relative position of 5A, the voltage induced on ya and that on yc will be added in a same direction, and the amplitude of the induced voltage is maximum. In a relative position of 5D, which is equivalent to 5A when conductors ya, yc are changed to conductors ye, yg, the induced voltage is maximum again. In a relative position of 5C, the direction of the induced voltage is reversed, but the amplitude of the voltage is the same with that in the relative position of 5A.

At a relative position of 5B, which is the center position between 5A and 5C, the induced voltage on the No. 1 winding 13 becomes a minimum. The spacing between the No. 1 winding 13 and the No. 2 winding 14 is determined in such a way that the induced voltage on the No. 2 winding 14 becomes maximum at relative positions where the induced voltage on the No. 1 winding 13 is minimum.

As is evident from the foregoing descriptions in connection with FIG. 4, two auxiliary sense windings are at least necessary, since the induced voltage on one auxiliary sense winding is minimum at points spaced by a distance D, and at these points, the induced voltage on the other auxiliary sense winding which is sufficiently large, must be used.

Three or more auxiliary sense windings may be provided with a relative spacing of 2D/n, where n is the total number of the auxiliary sense windings.

Now, referring to FIG. 5, there are shown amplitude variations of the voltages induced in the auxiliary sense windings in relation to the X-position of the cursor coil 51. It is apparent from FIG. 4, that the induced voltages on the auxiliary sense windings have no dependence on the Y-position of the cursor coil 51. The abscissa of FIG. 5 is the X-position of the cursor coil 51, and the ordinate is the amplitude of the induced voltage on No. 1 winding 13 (FIG. 5(a)) and on No. 2 winding 14 (FIG. 5(b)).

Returning to FIG. 3, an amplifier 61 amplifies the voltage on the No. 1 winding 13, and an amplifier 62 amplifies the voltage on the No. 2 winding 14. A selector 6 selects the amplifiers 61 and 62 alternately. When the amplifier 61 is selected, the induced voltage on the No. 1 winding is filtered by a band pass filter (BPF) 7, and the amplitude is converted to a digital number by an analog digital converter (ADC) 8. The output of the ADC 8 is stored in the processor 4, and then the selector 6 selects the output of the amplifier 62. The induced voltage on No. 2 winding 14 is filtered by the BPF 7, and the amplitude is converted to a digital number by the ADC 8.

The output of the ADC 8 is added to the corresponding digital number stored in the processor 4 for a voltage on No. 1 winding. Since the value shown in FIG. 5(a) is added to the value shown FIG. 5(b), the resultant becomes as shown in FIG. 5(c). The amplitude shown in FIG. 5(c) will be called the resultant amplitude, and the minimum value in the resultant amplitude becomes larger than a predetermined value when the current in the cursor coil 51 becomes larger than a predetermined value, irrespective of the position coordinates of the cursor coil 51.

Since the cursor coil 51 is excited only when a nearby driver winding has an alternating current, the Y-position of the cursor 5 can be determined by scanning the driver windings and measuring the corresponding resultant amplitude.

Figure 6:
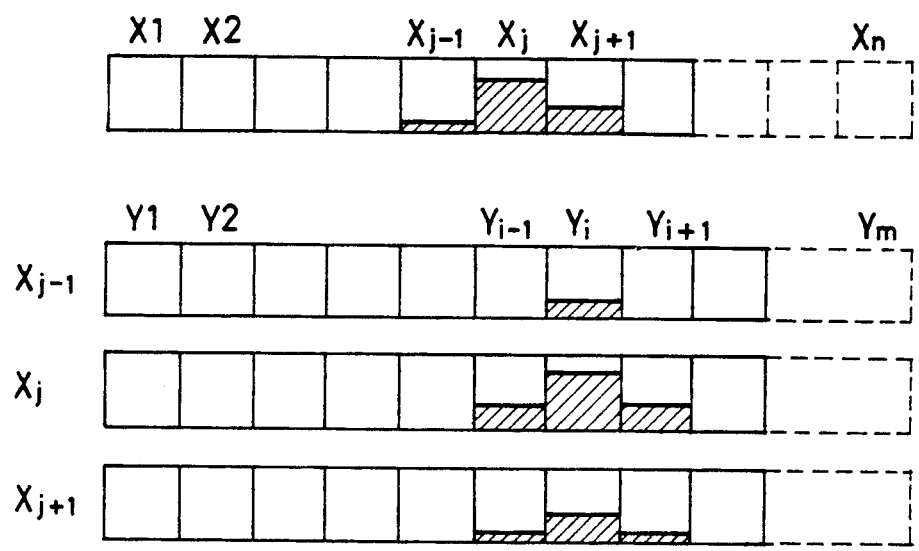
FIG. 6 is a diagram illustrating a time sequence of a position determination when auxiliary sense windings are used.

FIG. 6 is a diagram illustrating a time sequence of a position determination when auxiliary sense windings are used. In the embodiment shown by FIG. 6, there are two modes in a position determination. The first mode is Y-position determination mode, and the second mode is X-position determination mode.

In Y-position determination mode, the sense winding scanner 3 (FIG. 1) is not used. The driver winding scanner 2 scans the driver windings X1, X2, ... successively When the driver windings Xj−1, Xj, Xj+1 which are near to the cursor 5, are scanned, the resultant amplitudes calculated from the output of the amplifiers 61, 62 become as shown by hatched rectangles in the uppermost blocks in FIG. 6. From this amplitude variation, an exact Y-position of the cursor 5 can be determined.

When Y-position determination mode is completed, the driver winding scanner 2 ceases scanning and maintains the connection of driver winding Xj to the amplifier 21. In this state, the sense winding scanner 3 scans the sense windings Y1, Y2, ... successively. The amplitudes from the sense windings Yi−1, Yi, Yi+1 are indicated by hatched rectangles shown in blocks determined by Xj, Yi−1; Xj, Yi, Xj, Yi+1. From this amplitude variation, an exact X-position of the cursor 5 can be determined.

In the X-position determination mode, the driver winding scanner 2 sometimes connects also the driver windings Xj−1, Xj+1 which are adjacent to the driver winding Xj, to the amplifier 21, and for these positions of the driver winding scanner 2, sense winding scanner 3 scans the sense windings to obtain amplitude information as shown in FIG. 6. This is to confirm the Y-position of the cursor by sense windings.

In the scanning procedure as shown in FIG. 6, all the blocks having a dotted line on any side, need not be scanned by the same reason described in connection to FIG. 2.

Figure 7:
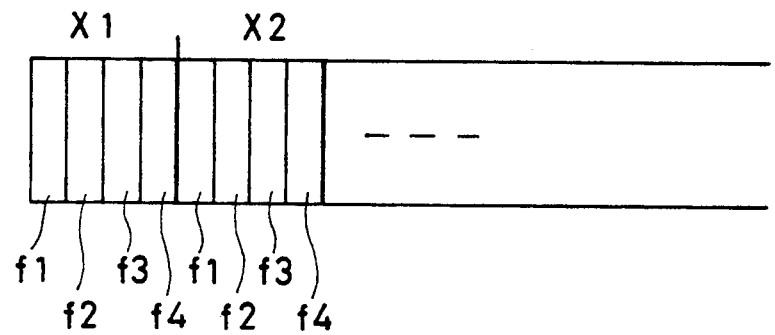
FIG. 7 shows a time sequence of the frequency variation in the driver current.

In an embodiment of this invention, the frequency of the alternating current in driver windings is changed in accordance with a predetermined program. FIG. 7 shows an example of a time sequence of the frequency variation in the driver current. In this example shown in FIG. 7, the frequency is changed from f1 to f4 during a time interval when the driver winding X1 is connected to the amplifier 21, and then the driver winding scanner 2 connects the driver winding X2 to the ampliier 21, and the frequency of the current is changed again from f1 to f4.

Each frequency can specify an attribute of the determined position. For example, an input timing of the determined position or a colour by which the determined position is displayed on a screen can be specified by a frequency in the frequency variation as shown in FIG. 7.

For the frequency variation of the driver current, the cursor 5 must be provided with a means for changing the tuning frequency, or cursors tuned to different frequencies must be prepared.

Figure 8:
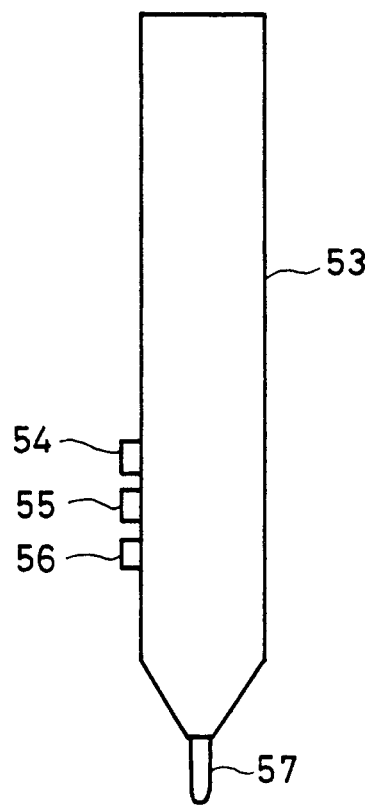
FIG. 8 shows an embodiment of a cursor configuration.
Figure 9:
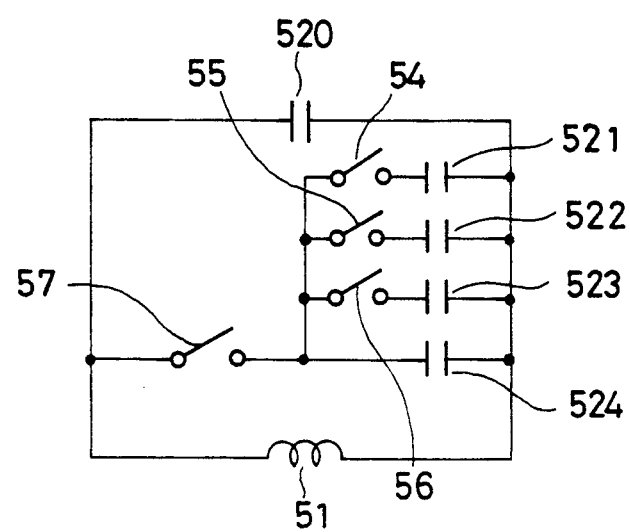
FIG. 9 shows a circuit diagram of a tuning circuit of a cursor.

FIG. 8 shows an embodiment of a cursor configuration having a means for changing the tuning frequency, and FIG. 9 shows a circuit diagram of the cursor shown in FIG. 8.

In these drawings, 51 is a cursor coil, 520, 521, 522, 523, 524 are capacitors. 53 is a pencil shaped casing, and 54, 55, 56, 57 are on-off switches, the switch 57 is a push-button switch having an outward appearance resembling to a pencil tip.

Switches 54, 55, 56 are hand-operated switches provided on the casing 53 of the cursor. The coil 51 and all the capacitors 520-524 are encased in the casing.

When the tip 57 is not pressed to the tablet, only the capacitor 520 is connected to the coil 51. When the tip 57 is pressed and the push-button switch is closed, the capacitor 524 and any of the capacitors 521-523 corresponding to a closed contact of hand-operated switches 54-56 are connected in pararell to the capacitor 520.

In this embodiment shown by FIG. 9, the hand-operated switches 54-56 are effective only when the push-button switch 57 is closed, since switches 54-56 are connected in series with the switch 57. This serial connection to the switch 57 can prevent the error caused by misoperation of these hand-operated switches.

We claim:

1. A device for determining position coordinates of points on a surface, comprising:

a plurality of equally spaced driver windings, each of said driver windings having a pair of parallel conductors laid in an X-direction and mutually connected at one end, said X-direction being fixed to a surface of a tablet;

a plurality of equally spaced sense windings, each of said sense windings having a pair of parallel conductors laid in a Y-direction and mutually connected at one end, said y-direction being perpendicular to said X-direction so that there is no appreciable magnetic coupling from any one of said driver windings to any one of said sense windings;

a driver winding scanner which connects a driver winding successively selected from said plurality of driver windings to an output of an amplifier of an alternating signal current;

a cursor having a coil which forms a closed circuit and is magnetically coupled to both the driver windings and the sense windings, wherein the coupling coefficient between the cursor coil and either of said windings is a function of the distance of the cursor coil from said winding;

a sense winding scanner which connects a sense winding successively selected from said plurality of sense windings to a receiving amplifier;

a plurality of auxiliary sense windings, composed of a plurality of equally spaced conductors laid in the Y-direction and end-connected to form a serial circuit, said plurality of auxiliary sense windings being arranged with a mutual shift in the X-direction such that at least one of said auxiliary sense windings has a sufficiently large magnetic coupling to said cursor coil at any position of the cursor coil on said tablet; and a processor which controls said driver winding scanner in a first mode of measurement wherein the sum of the amplitudes of voltages of said auxiliary sense windings induced by the current in said cursor coil when said alternating current signal is flowing in a driver winding is detected to determine the Y directional position coordinate of said cursor based on the values of the sum of the detected amplitudes for all the driver windings and which controls said sense winding scanner in a second mode of measurement wherein said driver winding supplies said alternating current signal to the driver winding which gives the maximum sum of the amplitudes of the voltages on said auxiliary sense windings, and wherein the amplitude of the voltage on a sense winding induced by the current in said cursor coil is detected for determining the X directional position coordinate of said cursor coil from the values of the detected amplitude for all sense windings.

2. A device of claim 1 wherein said alternating current signal supplied from said amplifier to said driver windings, has a frequency which changes in accordance with a predetermined program.

* * * * *